United States Patent [19]

Chenery

[11] 4,246,837
[45] Jan. 27, 1981

[54] MEAT CUTTING APPARATUS

[75] Inventor: Brian R. Chenery, Bury St. Edmunds, England

[73] Assignee: Haverhill Meat Products Limited, Haverhill, England

[21] Appl. No.: 917,039

[22] Filed: Jun. 19, 1978

[30] Foreign Application Priority Data

Jun. 20, 1977 [GB] United Kingdom ............... 25696/77

[51] Int. Cl.³ ...................... B23Q 15/00; B23Q 15/14; B23Q 15/22
[52] U.S. Cl. ......................................... 99/486; 99/489; 99/491; 99/538; 99/567; 17/1 R; 83/365; 83/370
[58] Field of Search .................. 99/489, 491, 537–541, 99/567, 589; 17/1 R, 21, 50, 52; 83/364, 365, 368, 370, 371, 372, 69

[56] References Cited

U.S. PATENT DOCUMENTS

| 3,237,664 | 3/1966 | Macy et al. | 99/538 |
| 3,249,139 | 5/1966 | Runnells, Jr. et al. | 99/589 |
| 3,373,787 | 3/1968 | Tands | 99/489 |
| 3,735,247 | 5/1973 | Harker | 17/1 R |
| 4,114,492 | 9/1978 | Skidmore | 83/371 |

Primary Examiner—Harvey C. Hornsby
Assistant Examiner—Timothy F. Simone
Attorney, Agent, or Firm—Sughrue, Rothwell, Mion, Zinn and Macpeak

[57] ABSTRACT

The invention comprises an apparatus for automatically removing fat from a meat carcass. A sensing station includes a row of needle probes which can be inserted into the carcass and which produce an electric signal at a fat/lean interface. The position of this interface relative to a support is recorded for each probe in a memory unit, and the carcass is then passed to a cutting section where it is drawn over a knife blade. The height of the knife blade is adjustable by a servo-motor controlled from the memory unit, and as the carcass is pulled over the knife, information from the memory unit is progressively released to adjust the knife so that the cut through the carcass follows the previously-sensed fat line.

8 Claims, 2 Drawing Figures

MEAT CUTTING APPARATUS

BACKGROUND OF THE INVENTION

This invention relates to a method and apparatus for automatically separating fat from lean meat in a meat carcass.

While the invention is primarily intended for the removal of fat from large meat portions such as whole or half carcasses, it will be appreciated that it can be applied to any size of meat joint and the term "carcass" used herein includes a complete meat carcass or any part thereof such as a cut or joint. The invention is particularly useful for the removal of fat from a back of pork or bacon (treated pork), but it can be applied to any type of meat.

The separation of lean meat from fat in an animal carcass is desirable for the production of meat joints which include the minimum amount of fatty tissue. Due mainly to the difficulty of determining the fat/lean interface within a meat carcass, this operation has hitherto been carried out by skilled operators by hand or on manually operated machines. The present invention provides a means of automatically separating fat from lean meat in a meat carcass.

SUMMARY

In its broadest aspect, the invention provides apparatus for removing fat from joints of a meat carcass comprising sensing means operable to sense the distribution of fat and lean meat within the carcass, and cutting means operating in response to signals from the sensing means to separate the fat from the lean meat.

In order to achieve the required sequence of operation, the sensing means operates to generate signals indicating the fat/lean interface along the length of the carcass and these signals are fed into a data store. The carcass is then moved into contact with the cutting means which is provided with a cutting member which can be moved relative to the carcass in response to signals from the data store. The carcass is then moved over the cutting means and the position of the cutting member is varied in response to signals from the data store so that a cut is made along or parallel to the fat/lean interface as previously determined by the sensing means.

The sensing means preferably consists of a matrix of electrically-operated needle probes which are arranged on a support extending parallel to the direction of movement of the carcass through the apparatus and which are sensitive to a change in electrical conductivity which occurs at a fat/lean interface. The sensing probes may operate on a different principle to that described above. For example, a fat/lean interface may be sensed by probes operating ultrasonically or using photoelectric cells; probes using microwaves are also suitable.

In the sensing operation, the matrix of needle probes are pushed into the meat carcass to penetrate through the fat into the lean. The needle probes are then withdrawn, and the change in conductivity from the lean to the fat and the thickness at which this occurs relative to the outside is registered for each probe. This information is retained by the data store.

The carcass is then moved by a conveying device horizontally past the cutting member, which suitably comprises a knife blade the height of which is adjustable by means of a servo-mechanism operating in response to information held by the data store. As the carcass is moved into contact with the knife blade, the stored data is released and the height of the blade is automatically adjusted by the servomechanism as the carcass is pulled over the blade.

Suitably, the matrix of needle probes is located beneath a separate sensing conveyor on which each carcass is loaded prior to the sensing operation, although it will be appreciated that a single conveyor device can be used for both sensing and cutting operations. It is preferable to provide a pressure plate which can be lowered onto the carcass to apply light pressure as the matrix of needle probes is raised to penetrate into the meat. The conveying device which conveys the carcass through the cutting means suitably comprises a pair of vertically spaced conveyor belts between which the meat is held and driven into the path of the cutting knife. Suitably, the bottom conveyor of the pair is a plain or ribbed belt running over a fixed base plate, but it is preferable to form the upper conveyor as a pair of ribbed and sprung belts which can grip and transport the carcass through the knife.

The invention also includes a method for removing fat from a meat carcass, comprising sensing the distribution of fat and lean meat within the carcass, storing signals indicating said distribution in a data store, and separating the fat from the lean meat in the carcass using cutting means operating in response to information from said data store.

DESCRIPTION OF THE PREFERRED EMBODIMENTS

The features of the apparatus are described generally with reference to FIG. 1, while the detailed operation of the apparatus will be described with reference to FIG. 2.

Figure 1:
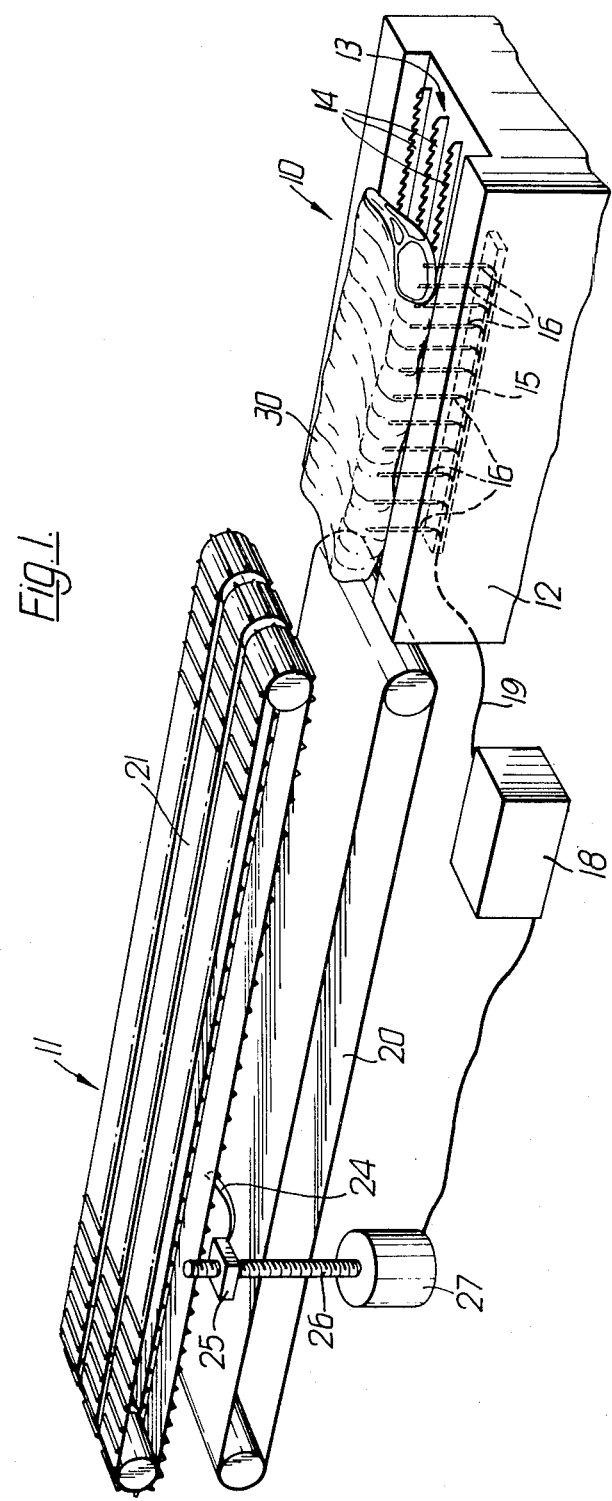
FIG. 1 shows a perspective diagrammatic view of apparatus for removing excess fat from a meat carcass comprising a back of pork.

Referring to FIG. 1, the apparatus consists generally of a sensing section 10 and a cutting section 11. The sensing section 10 comprises a support 12 in which is mounted an indexing conveyor 13 which in this case comprises three rows of longitudinally displaceable gripping teeth 14, which grip but do not damage meat supported on the conveyor. A sensing device is located beneath the indexing conveyor 13 and this comprises a support 15 in which is mounted a row of upwardly-extending needle probes 16 spaced longitudinally of the conveyor 13 at approximately 5 mm intervals. The needle probes are operated electrically, and are connected to a memory unit 18 by a cable 19. The support 15 and needles 16 can be displaced upwardly and downwardly by means (not shown in FIG. 1) so that needles penetrate into a carcass 30 on the indexing conveyor 13.

The cutting section 11 comprises a low conveyor 20 and an upper conveyor 21 between which a meat carcass can be firmly located. The lower belt 20 runs on a firm base, while the upper conveyor comprises three separate belts which are ribbed to provide additional grip. A cutting device is mounted adjacent the conveyors 20, 21, and this includes a knife blade 24 which extends in the space between the conveyors and which is fixed to a support 25 which engages the screwthread on a rotatable spindle 26. The spindle can be driven by a motor 17 to vary the height of the blade 24 in the gap between the two conveyor belts.

In the fat-removing operation, the joint 30, which in this case is a back of pork, is loaded onto the indexing conveyor 13 and is fed to an end stop (not shown). A top plate (not shown in FIG. 1) descends onto the joint and applies light pressure as the sensing probes 16 are raised to penetrate into the carcass, passing through the fat into the lean meat. Side guides ensure that the line of penetration lies along the line of the eye muscle in the meat. The needles are then withdrawn and the change in electrical conductivity which occurs when the probes pass from the lean meat to the fat is sensed, and the thickness at which this occurs relative to the outside for each needle is registered and retained in the memory unit 18. When the support 15 reaches the bottom of its travel, the end stop is raised and the joint is indexed forward between the main cutting conveyors 20 and 21. A sensor is triggered as the meat approaches the knife blade 24, and this releases the stored data from the memory unit so that the height of the blade is automatically adjusted by the motor 27 as the knife blade passes through the meat, resulting in a cut line which follows the fat/lean interface (or the degree of fat to be removed which can be preset into the control unit).

The operation of the apparatus shown in FIG. 1, and particularly the electrical circuitry relating thereto will now be described in more detail with reference to FIG. 2. In addition to those parts shown in FIG. 1, FIG. 2 shows the pressure plate 32 which is used to hold the meat in position on the conveyor 13 during the sensing operation, together with its pneumatic operating cylinder 33 and limit switch 34. The end stop located at the front of the conveyor 13 is indicated at 36, and the drive motor for conveyor 13 at 37. A pneumatic cylinder for operating the probe assembly 15 and 16 is shown at 38.

When the joint is loaded onto the indexing conveyor 13, (which is shown schematically as a belt conveyor in FIG. 2) the conveyor is started by operation of drive motor 37 and the joint is moved into position against the stop plate 36. Detector 40 senses when the meat is in the correct position and stops the motor 37. Cylinder 33 is then operated to drop the pressure plate 32 onto the carcass and applying a light pressure to the meat whilst the measurement of fat level is carried out. When the pressure plate is in the correct position, the limit switch 34 is made and this activates cylinder 38 and begins the sensing operation.

The needle probes 16 are inserted into the joint to a point at which all the probes extend into the lean meat. The probes are then withdrawn by reversing cylinder 38, and the change in conductivity from the lean meat to the fat and the thickness at which this occurs relative to the surface of the meat is measured for each probe. Signals from the probes pass to amplifiers 56 and these signals are fed from the amplifiers to an analogue/digital converter 41 where they are passed via a digital counter 42 to a digital memory store 43. All these operations are controlled through a central control unit 45 which is adapted to receive signals from all sensors and limit switches.

When readings have been received by the memory unit 43 from all the probes 16, the probes are retracted from the joint and the end stop 36 on indexing conveyor 13 is raised; at the same time, the pressure plate 32 is retracted.

Figure 2:
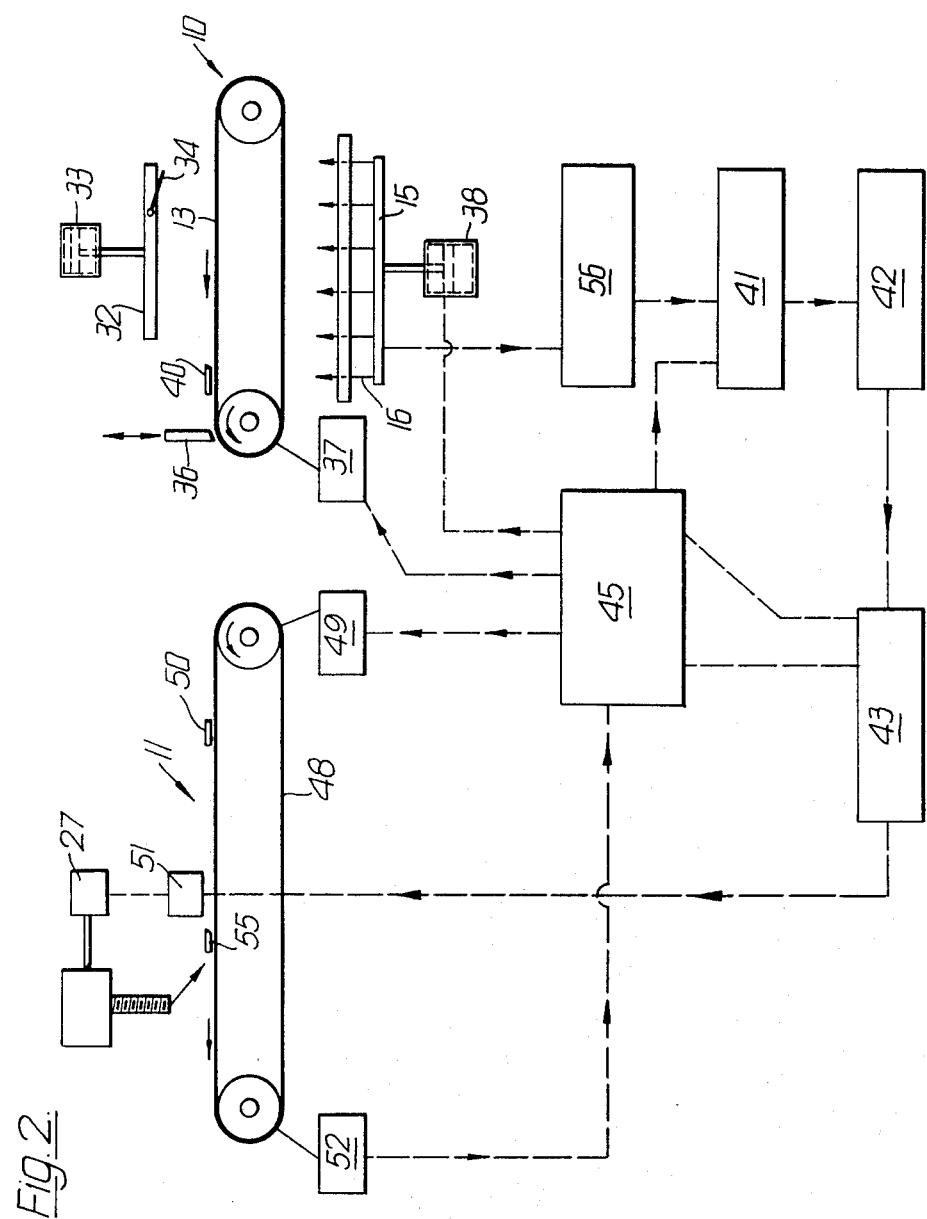
FIG. 2 shows schematically the layout of the basic components used in the apparatus shown in FIG. 1.

Immediately the plates 32 and 36 reach their fully retracted position, motor 37 is activated to drive the indexing conveyor 13, and the joint is moved towards the cutting section 11 where it is received by the cutting conveyors 20, 21 (shown as single conveyor 48 in FIG. 2). These conveyors are provided with a drive motor 49.

Operation of the conveyor drive motor 49 and the servo-motor 27 controlling the vertical position of the knife 24 are controlled via the control unit 45 through decoders 51 and 52.

Entry of the carcass 30 onto the cutting conveyor 48 is sensed by means of a detector 50, and on activation of this detector the control unit 45 re-sets the indexing conveyor 13 for re-loading and simultaneously releases to the servo-motor 27 the positional data from the memory store 43 which was received from the front probe in the matrix 16; the servo-motor 27 positions the knife 24 correctly in relation to the lean/fat interface for the entry cut into the carcass. As the meat is transported through the blade 24, detector 55 is activated and the control unit 45 begins to release the additional positional data for each probe in sequence from the memory unit 43. The items of information are released in conjunction with the decoder 52 which gives the distance travelled by the meat relative to the knife and each probe position.

When the cut meat leaves the knife 24, the sensor 55 freezes the servo-motor 27 until the next carcass is detected and the sequence of events beings again.

All the sensing signals, the output signals to the motors and the positional mechanism can be controlled by the control unit either in an entirely automatic manner or alternatively by a mixture of a manual and automatic operation. The control unit can be programmed such that the cut line runs along the lean/fat interface or parallel to the lean/fat interface or bears any desired relation to it. Adjustment of the relative position of the blade and the joint can be achieved either by movement of the knife (as described) or by positional adjustment of the carcass itself, and the cutting operation may be performed by holding the carcass stationary and moving the knife blade through the meat.

Where desired, instead of re-adjusting the position of the knife in accordance with information received from each individual probe, an averaging device may be included in the control circuit which takes a mean value of the probe readings and operates the servo-motor to adjust the knife position continuously during the cutting operation; in this way, the number of probes required can be reduced and the apparatus simplified.

The measuring probe arrangement could be arranged to operate from the top of the machine, and the sensing and cutting operations could be carried out on a single conveyor device. The sensing probes can be mounted on a movable support which is driven at the same speed as the cutting conveyor, in order to speed up the operation of the machine.

It will be appreciated that the operation of the apparatus need not be restricted to sensing and cutting respectively in one direction and one plane. If desired, additional probes may be provided extending laterally of the sensing conveyor, and the knife servo-mechanism arranged to vary the inclination of the knife between the cutting conveyors in addition to varying its height. While such an arrangement requires more complicated controls and circuitry to that described above, extremely accurate and economic fat removal can be achieved in this manner.

I claim:

1. Apparatus for removing fat from a meat carcass comprising:
   (a) a measuring station including carcass support means for supporting a meat carcass, and sensing means positioned to be inserted in said carcass and operable to obtain a profile of the fat/lean interface across substantially the whole of a carcass disposed on said carcass support means;
   (b) data storage means connected to said sensing means operable to receive and store information from said sensing means indicative of said fat/lean interface;
   (c) means for moving a carcass from said measuring station to a cutting station; and
   (d) said cutting station comprising cutting means including a cutter device for cutting into a meat carcass to remove fat therefrom, and a control means connected to said data storage means and said cutting means operable to adjust the relative positions of the cutter device and a meat carcass at said cutting station in response to receipt of stored fat/lean interface information from said data storage means;
   said data storage means being adapted to release said stored information to said control means when the appropriate meat carcass reaches said cutting station, and said control means being operable to continuously adjust the relative positions of said cutter device and said meat carcass during the progress of a cutting operation in response to said stored information.

2. Apparatus as claimed in claim 1, wherein the cutting means is operable to cause relative movement in one direction between the carcass and the cutter device to cause the cutter device to cut into the meat carcass, and the control means is operable to adjust the relative positions of the cutter device and the carcass in response to information from said data storage means in a direction substantially at right angles to the direction of relative movement between the carcass and the cutter device.

3. Apparatus as claimed in claim 2, wherein the cutting means includes conveyor means for conveying a carcass into cutting contact with said cutter device to perform said cutting operation, and said cutter device is fixed in the direction of movement of said conveyor means.

4. Apparatus as claimed in claim 3, wherein the conveyor means comprises a pair of spaced conveyor belts having substantially parallel conveying surfaces between which a carcass can be entrained, and said cutter device comprises a cutter blade mounted on a support and extending between said conveying surfaces in a plane substantially parallel thereto, said control means being operable to adjust the lateral displacement of the blade between said conveying surfaces.

5. Apparatus as claimed in claim 1, wherein said sensing means comprises a support, at least one row of probes each mounted on the support and adapted to penetrate a meat carcass and sense a fat/lean interface therein, and probe drive means acting on the support capable of inserting the probes into and withdrawing the probes from the meat tissue, each of said probes adapted to generate signals indicating the depth of penetration into the meat relative to said support at which the fat/lean interface occurs.

6. Apparatus as claimed in claim 5, wherein said probes each comprise electrically-operated needles probes adapted to generate an electrical signal following a change in electrical conductivity occurring at a fat/lean interface.

7. Apparatus as claimed in claim 5, wherein said sensing means includes pressure plate means for applying pressure to the meat carcass in a direction opposite to the direction of insertion of the probes whilst the probes are inserted, and the row of probes are aligned in the direction of movement of the carcass past the cutter device.

8. Apparatus as claimed in claim 7, wherein said carcass support means comprises a conveyor device for the carcass on which the sensing operation is performed, and the probe drive means are operable to extend the probes out of the conveying surface and into a carcass supported thereon, the conveyor device being operable to move the carcass towards the cutter device after the sensing operation has been performed.

* * * * *